United States Patent [19]

Daigle et al.

[11] Patent Number: 4,693,482
[45] Date of Patent: Sep. 15, 1987

[54] MOLDED ELASTOMERIC CIRCULAR GASKET

[75] Inventors: Clement Daigle, Saint-Jean Chrysostome; Emile Gonthier, St.-Henri, Cte Levis, both of Canada

[73] Assignee: Les Industries Fortier Ltee, Canada

[21] Appl. No.: 777,613

[22] Filed: Sep. 19, 1985

[51] Int. Cl.<sup>4</sup> ............................................. F16J 15/32
[52] U.S. Cl. ................................. 277/207 A; 277/152; 285/230; 52/21
[58] Field of Search ................... 277/152, 153, 207 R, 277/207 A, DIG. 2; 285/110, 230, 231, 345; 52/20, 21

[56] References Cited

U.S. PATENT DOCUMENTS

| | | |
|---|---|---|
| 2,924,427 | 2/1960 | Larson . |
| 2,935,349 | 5/1960 | Burch . |
| 3,348,850 | 10/1967 | Scales . |
| 3,727,876 | 4/1973 | Keyser . |
| 3,758,066 | 9/1973 | Skinner et al. . |
| 3,759,285 | 9/1973 | Yoakum . |
| 3,787,061 | 1/1974 | Yoakum . |
| 3,832,438 | 8/1974 | Ditcher . |
| 3,874,063 | 4/1975 | Skinner et al. . |
| 4,159,829 | 7/1979 | Ditcher ........................ 277/207 A |
| 4,200,299 | 4/1980 | Carlesimo .................. 277/207 A X |
| 4,333,662 | 6/1982 | Jones . |
| 4,387,900 | 6/1983 | Ditcher et al. . |

FOREIGN PATENT DOCUMENTS

| | | |
|---|---|---|
| 964043 | 3/1975 | Canada . |
| 971200 | 7/1975 | Canada .............................. 285/230 |
| 971997 | 7/1975 | Canada . |
| 996150 | 8/1976 | Canada . |
| 1018331 | 10/1977 | Canada . |
| 1073938 | 3/1980 | Canada . |
| 1077692 | 5/1980 | Canada . |
| 1079993 | 6/1980 | Canada . |
| 1112468 | 11/1981 | Canada . |
| 290612 | 6/1965 | Netherlands . |

Primary Examiner—Robert S. Ward
Attorney, Agent, or Firm—Lerner, David, Littenberg, Krumholz & Mentlik

[57] ABSTRACT

A manhole construction for assuring tightly sealing a manhole/sewer pipe connection. The heart of the invention resides in a molded elastomeric circular gasket for resiliently supporting a sewer pipe in a manhole opening and sealing the space between the wall of the opening and the surface of the pipe. The transverse cross-section of the gasket has a generally triangular head, with a forward face provided with an arcuate depressing therein, and a sloping rear face; a generally rectangular body, integral with the generally triangular head and generally "L" shaped leg depending from the body and coextensive with the rear face of the body, the leg of the "L" being directed towards the forward face.

4 Claims, 7 Drawing Figures

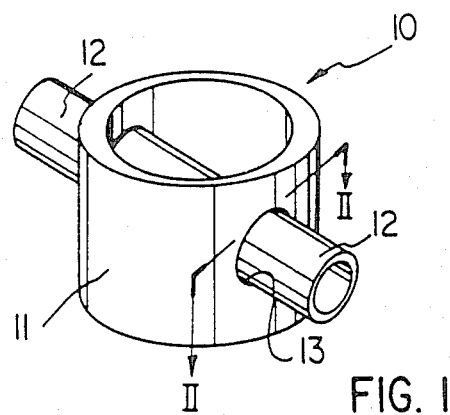
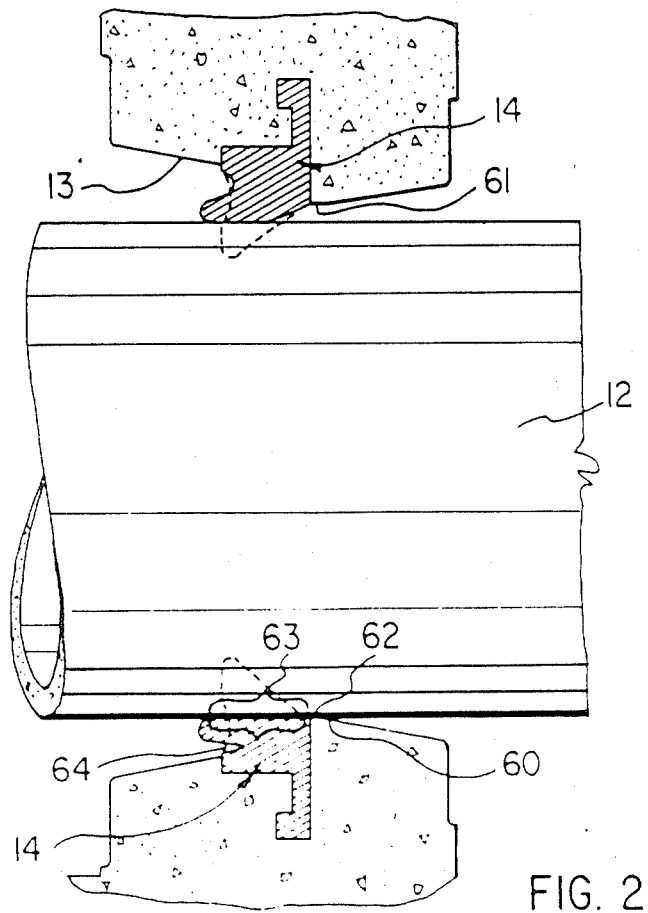

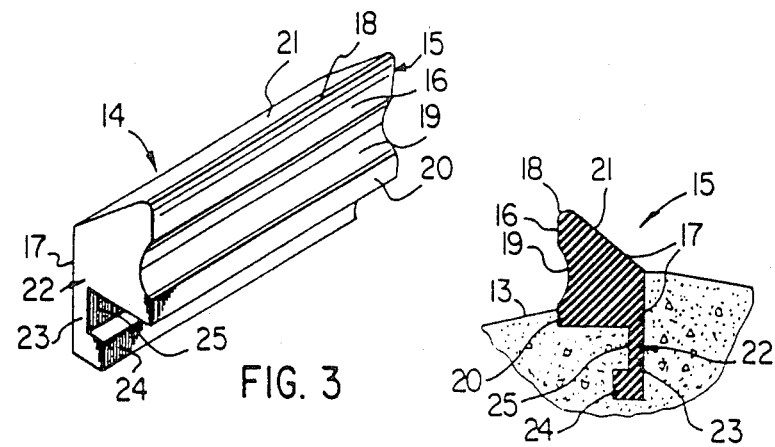
FIG. 3
FIG. 4
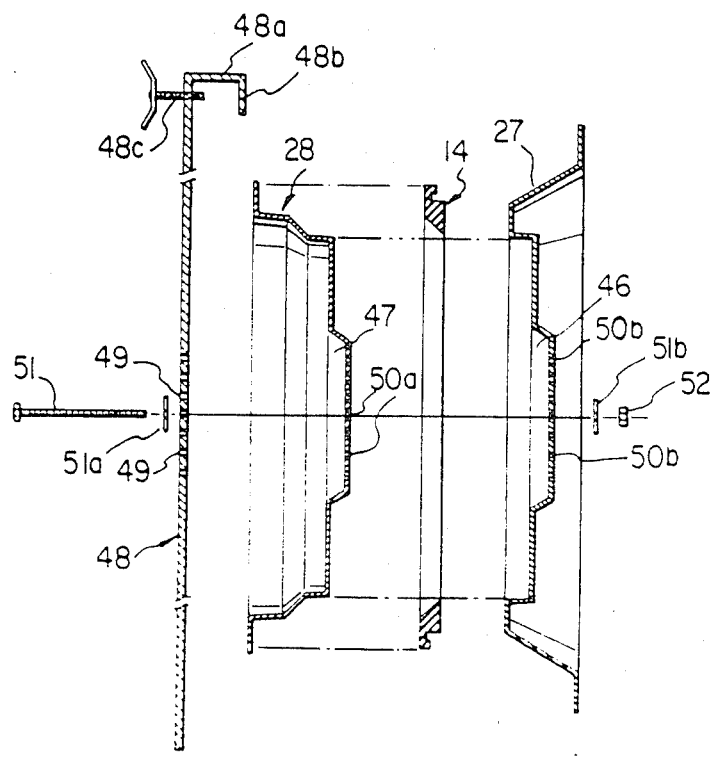
FIG. 5

MOLDED ELASTOMERIC CIRCULAR GASKET

BACKGROUND OF THE INVENTION (a) Field of the Invention

This invention relates to the installation of sanitary sewers, and is particularly concerned with the problem of tightly sealing a manhole against inflow or outflow of liquid, at the points where a sewer pipe passes through its walls. The invention also relates to elastomeric gaskets for resiliently supporting and sealing the space between a pipe and the surrounding surface of an opening through which the pipe passes.

This invention also relates to an apparatus for supporting a rubber sealing ring or gasket in position while a concrete structure is cast thereabout, the apparatus serving the define an opening in the concrete structure and to support the rubber-sealing ring in position while the concrete is formed thereabout in securing relation. This invention also relates to an apparatus for use in the formation of manholes. In particular, the invention is also concerned with the production of precast manhole bases.

(b) Description of the Prior Art

The construction of concrete manholes is heavy, dirty work and the men who engage in this type of work are usually classified as unskilled labour, the use of the pre-cast base having a pipe section precast therein and pre-sealed thereto have also been proposed heretofore. Such pre-sealed structures lack the flexibility needed to accommodate changes that are frequently dictated by conditions encountered in the field and which are not known at the time the installation is in the design or planning stage. Hence it is advantageous if a method that is devised for sealing the annular opening between sewer pipes and concrete manholes is simple, inexpensive and easy to follow and use.

When forming openings in poured concrete structures it is necessary to permit ample time for the concrete to set to a relatively rigid condition, before the apparatus used to form the opening in the concrete wall can be removed. Clearly, the longer the setting time, the more forms that must be used in order to enable the concrete objects to be produced on a mass production basis. Conversely, the shorter the curing time, the lower the capital investment that must be made in terms of forms, opening forming inserts, and the like. If the opening forming inserts are removed too soon, before the concrete is sufficiently set, the rubber gasket being set in the concrete opening may be jarred or moved prematurely, and consequently the water-tightness of the seal may be broken. Furthermore, in a heavy business like the concrete pouring business, and concrete being a good fastening agent, it is frequently necessary to use a sledge hammer or some other heavy object to break loose an insert forming an opening in a concrete wall. These heavy removal techniques contribute to the probability that the seal formed in place in the poured concrete will be jarred in a manner which breaks the water-tightness of the seal.

While it is important to keep the interior of a manhole reasonably dry, this has proved to be a difficult objective to accomplish where pipes pass through a manhole wall. Concrete cannot economically be installed with precisely smooth surfaces. Gaskets and other seals are not always effective in situations of the type. Too often water seeps past them, where irregularities, holes or humps are present in the concrete.

The sealing methods and seal constructions heretofore used are generally time consuming in application, and thus require that ample curing time be given to the concrete before forms can be removed. Long curing times for poured concrete, particularly in mass production situations, increases the cost of manufacture of the poured concrete forms. Furthermore, complicated pouring techniques tend to increase the cost of the poured concrete structures.

One proposed sealing technique has been the installation of Orings between suitably shaped collars which surround the pipe and mate with the inner surface of the opening through which the pipe passes. This has not been entirely successful, however, for minor imperfections in the concrete will permit the seepage of moisture past the O-ring gasket. Furthermore, such a gasket must be tight along at least two lines of contact, and this doubles the problem of avoiding irregularities and roughness at any point which comes in contact with the O-ring. Since the O-ring is solid, it is not easily forced into different shapes in order to conform to local irregularities in the surface or to imperfections in concentricity. Since the O-ring can roll upon itself, it needs extraneous fittings to make it stay in place.

Because of the conditions under which sewer pipe is installed, it frequently happens that a section of pipe will lie at an angle to the overall axis of the pipe, due to subsidence in a muddy trench, lack of care in back filling, or any of numerous other causes. When such a condition arises and affects a section of pipe which is to pass through the wall of a manhole, it is quite important that the opening through which the pipe passes should be so constructed as to allow for variations in alignment.

As noted hereinbefore, it has been proposed to use molded gaskets of elastomeric material and shaped like an ordinary washer. Such washers are embedded in concrete about their outer margin, and lie normal to the axis of the pipe. They are subject to the disadvantage that the elastomer used has limited stretch in radially outward direction. That is, even though it can be made with an undersized hole, so that the pipe will stretch the material on being inserted, the amount of stretch is not sufficient, in the plane of the gasket, to provide enough freedom for distortion to preserve a tight seal.

The shear stress imposed on sewer pipe passing through a manhole opening may be very severe. Sometimes it is sufficiently substantial to break the pipe right off. If the load, including not only the weight of the pipe and its contents, but also that imposed by fill, traffic stress, and vibration, is great, the pipe will be driven down into the inner edge of the rubber in the lower part of the gasket, directly under the pipe, and the amount of compression may be sufficient to cause the top of the pipe to pull away from the inner upper edge of the gasket, thus leaving a small but opening between gasket and pipe. If the elasticity of the elastomeric material is sufficient to ensure that its upper rim will follow the pipe even under the stress conditions stated, it is probably so "tight" that insertion of the pipe is practically impossible. This factor is important, for the choice of elastomeric material is limited. The ASTM specifications for rubber gasketed sewer pipe are quite strict. The elastomer usually conforms to ASTM 13, SBR 1200, or to ASTM 361, Polystyrene, TS 2400.

If the embedded portions of the gasket are planar and extend in a normal direction away from the pipe, they may be pulled right out of the concrete in which they are embedded, under stress of axial movement of the pipe.

One problem which faced the prior art was to provide an improved technique for positively and permanently anchoring the gasket in the cementitious material which defines the inner surface of the opening. The problem did not appear to be solvable by the use of individually molded unitary gasket washers ["washers" as used herein, refers to centrally-apertured articles of disk-like shape], since they lack sufficient resistance to compression in their lower, inner portion, which carries the major load, and were too subject to peripheral separation from the pipe in their upper portions. Furthermore, such washers would have to be stocked in many sizes.

As noted above, typical prior art structures include a sealing ring formed of rubber or rubber-like material which is inserted into the annular cavity formed in the usual pipe joint, whether this joint be formed between pipe sections or between the entry end of a second of pipe and the hole in a concrete manhole. Such prior art structures have not proven to ben entirely satisfactory from the standpoints of ease of installations, durability and economy. On one such structure, a sealing ring inserted into the joint cavity is provided with two flanges which may be forced apart by means of an auxiliary sealing wedge. The friction of engagement between the sealing ring and the opposing walls of the annular cavity provide the holding power against dislodgement, but it has been found that pressure fluid internally of the pipes can blow out the seal or produce leakage. In another prior art structure, annular metal clamps are used to secure the sealing ring into the cavity; however, this has proven to be costly and time consuming in the manufacture and installations thereof.

Dutch Pat. No. 290,612 of Raatjes dated June 10, 1963 provided a ring-shaped sealing member of the detachable, flexible coupling being located at the radially outwards or inwards directed ring respectively of the recess, forming the inner or outer surface of the coupling part that comprises the sealing member and forming, at both sides of the recess, a strip whose diameter in the axial direction gradually decreased, beginning at the edge of the recess. The cross-sectional pattern of the anchoring member of the molded washer shown therein seemed to be likely to remain embedded in its surrounding concrete, no matter how severe the stress upon it might become. But there seemed to be no way to convert a lineal extrusion having this cross-sectional shape into a disk-like washer, and no practical way to provide the endless cavity unless it could be formed by extrusion. Thus, this Netherlands Patent merely illustrated a gasket in the shape of a washer, having a corrugated face and having a rim embedded in concrete. Pressure of the pipe entering the washer distorted the latter, and effected a seal between pipe and opening. Unfortunately, if the material of which the gasket is composed was too stiff, it would not permit easy insertion of the pipe, or, if not stiff enough, it would permit tiny spaces to open up, under the stress of traffic shocks, through which water could flow.

Several other proposals have made in the past in Canadian Pat. No. 964,043, issued Mar. 11, 1975, to Harry W. Skinner, disclosed an apparatus adapted to support a rubber-sealing ring or gasket in position while a concrete structure is cast thereabout, the apparatus serving to define an opening in the concrete structure and to support the rubber-sealing ring in position while the concrete was formed thereabout in securing relation. The rubber seal was an elaborate and expensive generally V-shaped rubber sealing ring, which fitted between the circular opening in the manhole and the pipe penetrating into the interior of the manhole. The sealing qualities of the rubber seal were said to be enhanced by applying outward pressure on the arms of the V-shaped seal by driving a wedge-shaped material into the space existing between the arms of the V-shaped seal. This system was relatively successful but the V-shaped seal was prone to ripping or tearing when the pipe is introduced into the interior of the manhole.

Canadian Pat. No. 971,997, granted July 29, 1975, to John Ditcher, provided a method for installing a sealing member which yieldingly spans the annular space between the exterior surface of a sewer pipe when it passed through the opening in the wall of a manhole, and the inner surface of the opening through which the pipe passed. Ditcher disclosed an A-shaped sealing ring, of a particular specified cross-sections. This A-shaped seal performed reasonably well but was prone to breaking because of its hollow-core construction. Further, the two legs of the A-shaped seal were rather widely angled, and this construction, when the A-shaped seal was distorted by inserting the pipe through the opening in the manhole, tended to place considerable lateral and upward pressure on the two legs of the seal, with the result that one or both of the two legs broke free from the concrete in which the legs are embedded.

The invention provided in Canadian Pat. No. 971,997, issued July 29, 1975 to John Ditcher provided a method for installing a sealing element for use between the outer surface of a pipe and an opening in a wall through which the pipe passes. The method included casting a wall of settable material about a particularly described shaping member. The shaping member was provided with means defining a peripheral channel to engage a peripheral gasket ring of resilient material and to house a substantial portion only of the ring. A remaining portion of the ring was left extending into the settable material as it is being emplaced. The material was allowed to set and thereafter the shaping member was removed. This was said to provide a sealing member within the manhole opening.

The invention in Canadian Pat. No. 996,150 issued Aug. 31, 1976 to John Ditcher provided a gasket for sealing the space between a pipe and the surrounding surface of an opening through which the pipe passed. The gasket was composed of elastomeric material, having, throughout its extend, a uniform cross-section. The gasket is made from an extruded rubber strip, having a cross section in the shape of a capital A. When properly positioned in the manhole opening, the apex of the A was exposed, and extended radially inwardly to make first contact with the surface of the pipe. The legs of the A extended outwardly, and were embedded in cementitious material which lined the opening in the manhole wall. There was some difficulty in installation because the elastomeric gasket was made from an extrusion in the cross-sectional form of a capital A, and hence it required some distortion of the gasket, to fit this gasket onto the mold rings.

Canadian Pat. No. 1,018,331, issued Oct. 4, 1977, to Ronald E. Yoakum, disclosed a means of automatically affecting a seal at the junctures between a manhole and its inlet and/or outlet sewer pipe connections by the use of a seal. It also taught a method of installing the seal. A complex shaped elastomeric annular sealing means was positioned circumferentially within the opening in the manhole, was intricately connected to the wall portion of the manhole and was adapted for automatically engaging the sewer pipe which was inserted through the manhole opening. The seal provided a connection which was purportedly water proof. The Yoakum seal was rather complex in construction and hence both expensive and difficult to install. The construction of the seal involved a number of grooves and projections, and hence because of the nature of poured concrete which does not flow readily into small corners and openings, it was difficult to obtain a water-tight seal, particularly when the dry casting technique of pouring concrete was used.

The invention in Canadian Pat. No. 1,073,938 issued Mar. 18, 1980 to John Ditcher provided a molded elastomeric gasket for resiliently supporting a sewer pipe in a manhole opening and sealing the space between the wall of the opening and the surface of the pipe. The gasket had an outer cylindrical flange member connected to a main bulbous body portion by a composite inwardly directed annular web and an outwardly directed annular web. The main body portion was integrally connected to region of the inner surface o- the cylindrical flange member and integral a "T" cross-section head which was to be embedded in the material lining the manhole opening.

The invention in Canadian Pat. No. 1,077,692 issued May 20, 1980 to John Ditcher was based on the discovery that a seal having all of the desired properties could be made by utilizing an extrusion having a pipe-contacting part which, instead of being of A-shaped was pear-shape in section and was unitarily provided with a T-shaped anchoring part, the stem of the T being united with the bottom of the pear-shaped part and affording, when longitudinally considered, a web of substantial height and thickness. Such an extrusion can be used effectively only if handled in the complex manner specifically set forth.

The invention in Canadian Pat. No. 1,079,993 issued June 24, 1980 to Dominique Palazzo provided a sealing system, and a method of installation therefor, whereby the annular opening existing between an opening through the wall of a concrete manhole, and the inlet-outlet connection of the sewer pipe or conduit could be effectively and inexpensively sealed in a water-tight manner, to eliminate infiltration and/or ex-filtration of liquids into and out of the manhole. The seal is provided was said to be of sufficient flexibility in construction and design that it would be capable of continuing to maintain a water-tight seal between the manhole and the conduit, even when the manhole-conduit combination is subjected to significant degrees of distortion due to shifting earth, and relative mis-alignment occurs between the manhole opening and the conduit. The anchoring legs were subject to stress and strain, and, even though they were firmly embedded in the concrete, were subject to breakage at their flexive points, thus being prone to leakage.

The invention in Canadian Pat. No. 1,112,468 issued Nov. 17, 1981 to F. Poulette provided a method for installing a gasket in the peripheral wall of an opening in a masonry wall a particularly complicated series of steps using special complicated apparatus. The installing step required a high degree of expertise and adjustments for deficient sizes was difficult.

Typical seals were also disclosed in U.S. Pat. Nos. 2,924,427; 2,935,349; 3,348,850 and 3,832,438. Such annular seals were secured in place either by frictional contact with the walls defining the clearance or in the alternative by auxiliary clamping devices assembled to the pipe or to the concrete structure. Such sealing arrangements suffered from the disadvantage of being difficult and time consuming to install as well as being subject to leakage or blowout.

Another example of such gasket is shown in U.S. Pat. No. 3,832,438, issued Aug. 27, 1974. That gasket consists generally of a peak portion which engages the pipe and a leg portion which is embedded in concrete around the peripheral wall of the opening. In the above patent, the peak portion of the gasket is positioned in a recess formed between the mating edges of two oppositely tapered metal molds. The molds are mounted between the walls of a form and concrete is poured between the walls to embed the leg portion of the gasket in the peripheral wall of the opening when the concrete is set.

Another prior art gasket is embedded in the wall of the riser and projects inwardly of the opening through the riser to engage the outer surface of the intersecting feed pipe. The gasket is made of a resilient material which permits the gasket to yield and form a tight seal when the intersecting pipe is thrust into position.

The invention in U.S. Pat. No. 3,727,876, issued Apr. 17, 1973 to L. R. Keyser provided a three-piece assembly for the installation of the seal. The assembly includes inner and outer mold members, and a ring-shaped sustaining plate. Thus, this patent provided apparatus for forming a void through a molded wall during fabrication thereof and supporting a gasket for embedment in the wall about the void.

The invention in U.S. Pat. No. 3,758,066, issued Sept. 11, 1973 to H. W. Skinner et al provided an apparatus for forming a pipe joint sealing device which serves the dual purpose of supporting a rubber-sealing ring in position while concrete was cast thereabout and also for defining the opening into which the sealing ring is installed. This mold device included plug structure of particular specification. Here, too, the major problem was of easy adjustability. This patent suffered the deiciency that adjustments for different locations of the manhole openings were difficult.

The invention in U.S. Pat. No. 3,759,285, issued Sept. 18, 1973 to R. E. Yoakum provided an in situ seal in a hole in the wall of a manhole which was said to permit independent movement of either the pipes or the base to maintain the seal and yet to accommodate changing job conditions. However, because of the embedment means within the coverete, the seal could be worked lose and hence cause leakage.

The invention in U.S. Pat. No. 3,787,061, issued Jan. 22, 1974 to R. E. Yoakum provided an in situ seal in a hole in the wall of a manhole in which the pipe engaging portion was a pair of spaced apart ribs, releasably biased inwardly but adapted to be flattened into sealing engagement with the pipe. Such flattening did not always, however, provide a continuous watertight seal or movement or misalignment of the pipe or manhole.

In the invention in U.S. Pat. No. 3,874,063, issued Apr. 1, 1975 to F. W. Skinner et al a pipe joint sealing device is provided which includes an annular resilient body of rubber-like material. This body is generally a V-shaped cross-section which includes radially inner and outer annular body portions or flanges which is secured to the hole in the wall of the manhole by casting or molding concrete around the outer periphery or flange of the sealing ring such that when the concrete hardens, the ring is locked into position. A major deficiency is that, in order to effect a seal between the concrete manhole and the pipe a wedge of rubber material must be inserted into the space between the inner and outer flanges.

The invention in U.S. Pat. No. 4,333,662 issued June 8, 1982 to William D. Jones provides a gasket which is particularly suited for sealing the annular space between a pipe and a port in an underground structure is disclosed. The gasket comprises a hollow annular ring which surrounds the pipe and is connected by a narrow neck to a base at least partially embedded in the underground structure. The base has means extending around its outer periphery to mount the seal securely in the manhole and to provide a block against water seepage across the periphery of the gasket.

The invention in U.S. Pat. No. 4,387,900 issued June 14, 1983 to Jack Ditcher et al provides a resilient gasket having an outer annular flange positioned within a manhole opening and maintained thereagainst under compression by means of a compression band. The gasket is provided with a central opening defined by an enlarged beaded periphery having an elasticity adapted to tightly encircle the outer periphery of the pipe. A folded intermediate section is arranged between and integrally joined to the outer flange and the beaded inner periphery, the intermediate section is comprised of first and second diagonally aligned annular portions integrally joined along a fold to define a V-shape which imparts a yieldability enabling the gasket to maintain a watertight seal between the manhole opening and the pipe, even in the presence of a significant misalignment therebetween. A strap is positioned about the intermediate section of the gasket adjacent the inner beaded periphery to enhance the watertight seal between the gasket and the pipe. The compression band may be provided with pairs of substantially V-shaped slots which enable the band to assume a curvature in a direction transverse to the curved periphery in order to conform to the curvature of the mamhole opening. The clamping band is formed of a material which is impervious to the surrounding environment and has a gap and a segment hingedly connected to the main body thereof for placement in the gap and against the interior surface of the gasket to lock the compression band in position and maintain the gasket flange under compression. An expansion assembly includes an expansion ring which cooperates with a hydraulic jack and is positioned against the compression band to expand the compression band into position against the gasket flange and to apply uniformly around the compression band to insure proper positioning and locking of the clamping band.

SUMMARY OF THE INVENTION (a) Shortcomings of the Prior Art

While each of the above disclosed patented devices may function satisfactorily for its intended purpose, none has all of the attributes of a commercially desirable seal. For instance, such a seal should provide leak resistance up to 10 psi. and should enable the pipe to be deflected omnidirectionally up to 20° with respect to its receiving port. A satisfactory pipe seal should also prevent the pipe from contacting the bottom of the pipe-receiving port in response to transverse shear loads on the pipe as may be imposed by backfill and traffic loads adjacent the manhole. The seal should also be sufficiently compressible as to accommodate variations in the outside diameters of pipes of different materials which have the same nominal inside diameters. The seal should also be mounted securely in place and should be capable of in-field adjustments and repair to accommodate unusual situations. A desirable seal must also be sufficiently foolproof as to be capable of being installed by relatively unskilled labor, and the seal must be capable of being installed rapidly and in a minimum amount of time.

In spite of all the aforementioned prior art there is still a need for an arrangement and method for joining the ends of burried pipe to a manhole wherein precise location of the manhole is not required, and whereby a joint can be easily and quickly made. It is also desirable that a seal be effected automatically when a pipe is inserted into an opening in the wall of a manhole, and that such seal be maintained upon the occurrence of universal relative movements of either the manhole or the pipeline.

It is one object of the invention to provide shaping elements which will impart the desired configuration to the opening through which the pipe passes, which can be readily installed at the time the manhole is being cast, and whose location can be readily controlled at will, and which can readily removed after the concrete sets.

It is another object of the invention to configure shaping elements in such a way as to enable them to receive and securely hold in place an elastomeric gasket which surrounds the entire periphery of the opening and which will hold that gasket element in its intended position with portions thereof extending outwardly from the shaping element to be embedded in the concrete as the manhole is poured.

It is still another object of the invention to provide a gasket which can be readily formed by the extrusion of an elastomeric material, and which, as formed, is readily deformable so that it may locally yield to accommodate itself to irrregularities in surface or in concentricity as it yieldingly spans the distance between a sewer pipe and the surface of the opening through which the pipe passes.

A still further object of the present invention is to provide means automatically effecting a seal at the juncture between a manhole and its inlet and/or outlet pipe connections when a pipe is inserted therein and for maintaining the effectiveness of the seal during and after the occurrence of universal relative movement of either the manhole structure or the pipe structure.

It is another object of the present invention to provide a new apparatus for installing a gasket in the peripheral wall of an opening in a masonry wall.

It is yet another object of this invention to provide a combination gasket-supporting and concrete-molding device so arranged that upon positioning the same in a concrete mold, a concrete structure may be cast with the hole being formed by the device and a sealing ring or gasket permanently interlocked into the perimeter of the opening.

It is still another object of this invention to provide an apparatus for forming the opening in a concrete structure and mounting a rubber-sealing ring in relation thereto, the device being constructed such that once the concrete hardens it may be simply and quickly removed therefrom.

It is yet another object of this invention to provide a pipe joint sealing device which permits some relative movement between a section of pipe and another structure to which it is joined without causing failure of the seal or damage to the pipe.

Another object of this invention is to provide a manhole joint arrangement that can be pre-manufactured and which then requires no tools to install on site.

A further object of this invention is to provide a manhole joint arrangement that allows for variations to occur in the relative positions of the manhole and the pipe connected thereto.

(b) General Statements of the Invention

By one broad embodiment of this invention, an apparatus is provided for installing a gasket having a pipe-engaging portion and anchoring portion in the peripheral wall of an opening in a masonry wall, comprising: (a) an inner mold member of dished shaped having radially outwardly extending flanges thereon of greater diameter than the opening; (b) an outer mold member of complementary dished shaped having side flanges thereon of the same diameter as the opening; (c) means between the outer periphery of a flange on the outer mold member and a flange on the inner mold member adapted to receive the pipe engaging portion of the gasket and to allow the anchoring portion of the gasket to project radially outwardly; and (d) means for temporarily but firmly securing the inner mold to the outer mold.

By another embodiment of this invention, a forming apparatus for use in installing in place a sealing ring in the peripheral surface of a circular opening through a wall formed from a settable material comprising: (a) an inner mold member of dished shaped having radially outwardly extending flanges thereon of greater diameter than the opening; (b) an outer mold member of complementary dished shaped having side flanges thereon of the same diameter as the opening; (c) means between the outer periphery of a flange on the outer mold member and a flange on the inner mold member adapted to receive the pipe-engaging portion of the gasket and to allow the anchoring portion of the gasket to project radially outwardly; and (d) means for temporarily but firmly securing the inner mold to the outer mold and to the outer shell designed to form the peripheral surface.

By a still further embodiment of this invention, a molded elastomeric circular gasket is provided for resiliently supporting a sewer pipe in a manhole opening and sealing the space between the wall of the opening and the surface of the pipe, the transverse cross-section of the gasket having: (a) a generally triangular head, having a forward face provided with an arcuate depressing therein, and a sloping rear face; (b) a generally rectangular body, integral with the generally triangular head; and (c) a generally "L" shaped leg depending from the body, and coextensive with the rear face of the body.

By another embodiment of this invention, a gasket is provided for use in forming a fluid-tight seal between a pipe and a wall opening through which the pipe passes, the gasket being a molded elastomeric circular gasket for resiliently supporting a sewer pipe in a manhole opening and sealing the space between the wall of the opening and the surface of the pipe, the transverse cross-section of the gasket having: (a) a generally triangular head, having a forward face provided with an arcuate depressing therein, and a sloping rear face; (b) a generally rectangular body, integral with the generally triangular head; and (c) a generally "L" shaped leg depending from the body, and coextensive with the rear face of the body.

By yet another embodiment of this invention, a combination is provided for use in forming a fluid-tight seal between a pipe and a wall opening through which the pipe passes, the combination being in the form of a mass of settable material externally configured to provide the wall opening and a molded elastomeric circular gasket for resiliently supporting a sewer pipe in a elastomeric circular gasket for resiliently supporting a sewer pipe in a manhole opening and sealing the space between the wall of the opening and the surface of the pipe, the transverse cross-section of the gasket having: (a) a generally triangular head, having a forward face provided with an arcuate depressing therein, and a sloping rear face; (b) a generally rectangular body, integral with the generally triangular head; and (c) a generally "L" shaped leg depending from the body, and coextensive with the rear face of the body extending circumferentially about the opening in the mass with the entire "L"-shaped leg being embedded in settable material with the head portion of the gasket protruding into the opening.

By another embodiment of this invention, a combination is provided, the combination being a concrete manhole structure having a manhole opening through which a sewer pipe can pass and a molded elastomeric circular gasket for resiliently supporting a sewer pipe in a manhole opening and sealing the space between the wall of the opening and the surface of the pipe, the transverse cross-section of the gasket having: (a) a generally triangular head, having a forward face provided with an arcuate depressing therein, and a sloping rear face; (b) a generally rectangular body, integral with the generally triangular head; and (c) a generally "L" shaped leg depending from the body, and coextensive with the rear face of the body positioned between the inner and outer walls of the manhole and extending circumferentially about the wall opening with the entire "L"-shaped leg being embedded in the concrete surrounding the manhole opening and with the head portion of the gasket protruding into the manhole opening on the periphery thereof.

By a further embodiment of this invention, a shaping element is provided to define the inner surface of an opening through a wall of settable materal as it is being formed, the shaping element comprising: inner and outer mating parts, releasably securable together and providing an inner peripheral wall configured to produce an inner surface to the opening of the desired size and shape, and an outer peripheral wall configured to produce an outer surface to the opening, each of the parts having a transverse flange extending from its periphery, and having means associated with the flange to cooperate with the flange upon the other element, the flanges providing a peripheral channel; and means associated with the inner portions of the inner and outer mating parts to secure both parts together.

By another embodiment of this invention, apparatus is provided in a device for establishing a watertight seal between the inner surface of an opening in a manhole wall and the outer surface of a sewer pipe passing through the opening, the apparatus being for positing a peripheral gasket of elastomeric material in a locus within the concrete of the manhole wall, the apparatus comprising: an outer shaping element having a peripheral wall structure of the shape desired for the outer portion of the opening through the wall and terminating in a flange; an inner shaping element having a peripheral wall adapted to complement the outer element in providing the desired shape for the finished opening, the wall terminating in an outwardly extending flange; the adjacent surfaces of the flanges of the inner and outer elements providing, between the opposing surfaces, a peripheral recess which configured to receive and support a portion of the gasket strip first mentioned; the shaping elements being provided with releasable clamping means simultaneously to site the shaping elements at a predetermined location within the manhole wall thereby to site the opening, and to hold them together in use and impose a limited pressure on the gasket.

(c) Generalized Description of the Invention

As described above, the present invention involves the concept of providing a first support for the pipe, which support is sufficiently resilient to compensate for stress and for shear, is sufficiently flexible to accomodate extensive misalignment of the pipe, and yet is capable of affording an absolutely fluid tight seal in the rim of the opening. The gasket of an aspect of the present invention is easy to install, comparatively inexpensive to make, and extremely reliable in use. The sealing system of the invention utilizes a continuous profile having a generally triangular shaped head, including flat face portion provided with an inset arcuate depression, a sloping rear face, a flat base and flat rear wall extending downwardly to a forwardly-facing "L"-shaped leg. An effective water-tight seal is established when the pipe is inserted through the opening in the manhole because the outer diameter of the pipe, being of greater diameter than the inner diameter of the sealing ring, causes the pipe to contact and distort the rubber sealing ring such that the rubber sealing ring applies pressure to the external surface of the pipe, thereby providing a water-tight seal between sealing ring and the pipe.

The cylindrical ring is preferably positioned on the rim defined between the inner and outer mating dished mold rings so that its triangular shaped head is within the peripheral groove, and the "L"-shaped corresponding leg projecting outwardly. The complementary parts of the mold rings are clamped in place with the inverted manhole hold and are held therein by the adjustment securement clamping stave.

A suitable mold ring according to this invention for the installation of the novel gasket of this invention consists of inner and outer shells of dished shaped which are so configured that when assembled they define between them a peripheral groove which accommodates the triangular-shaped head, leaving the "L"-shaped leg free. In aspects of the present invention, the inner and outer shells are provided with complementary rectangular insets, provided with mating holes for adjustable securement within the manhole mold by the adjustment securement clamping stave. Concrete or other cementitious material is then applied to mold the manhole and also to define the peripheral wall of the opening in the manhole wall. The cementitious material covers the "L-shaped leg" and embeds it, but the triangular-shaped head is exposed, and is adapted to yield to receive the pipe inserted therein, upon separation and removal of the mold parts.

One of the advantages of the present invention is the unexpected discovery that extrusions having the cross-section form described can often be used with pipes of different sizes, without altering their cross-sectional dimensions. All that is necessary is to change the length of the extrusion and the diameter of the mold rings. This capacity to coact with pipe of many different sizes is believed to be due, in part at least, to the fact that the manner of use places considerable compression on the inner flattened face portion of the gasket, and causes tension on its outer, sloping periphery. As a consequence, the gasket of the present invention hugs the pipe tightly.

It must be realized that, in the past, the part of the gasket which lies at the bottom of the opening, when in use, had to sustain most of the load of the pipe and its contents, and in addition had to resist environmental stresses, which may be imposed upon the pipe outside of the manhole by the weight of the fill, or by impacts due to traffic shock, or by the dead weight of passing vehicles. If the prior art gasket were to be used, it could yield too much under these stresses, and become overly compressed at the bottom of the opening. The pipe could then pull away from the gasket at the upper part of the opening, thereby allowing fluid to pass the seal. Since the stresses imposed may sometimes be measured in thousands of pounds, particularly where the pipe is large—way 24" or 30" in diameter, it was thought to be necessary to employ a molded gasket ring which would manifest both sufficient resistance to compression at the bottom of the opening and sufficient capacity for expansion at the top.

The gasket of this invention described herein is remarkably adapted to meet this problem. It cooperates with a rim on the interior of the hole in the manhole to support such considerable weight without the need for a large mass of elastomeric material to be present to carry the weight imposed. Moreover, the flattened gasket provides an extensive rubbery seal between the pipe and the hole.

The other major need is to ensure that the gasket ring is so firmly anchored in the concrete as to resist any stress which might tend to dislodge it. This is ensured by the deep embedding of the "L-shaped" leg, as well as by the embedding of the base of the body in the surrounding concrete.

The concrete material used in casting the manhole will usually be a fairly stiff mix. Therefore, the forms can be stripped from the freshly cast pipe fairly soon after casting. This permits a minimum number of forms to be used in the operation and appreciably reduces the capital expenditures which would otherwise be necessary if the forms were retained about the pipe until they had cured.

By the same token it is desirable that the mold members may also be removed from the freshly cast pipe at the same time the pipe form is removed so that the mold members may also be reused and the number necessary kept to a minimum. However, as noted above, it is important that the gasket be shaped and positioned properly with respect to the hole in the wall of the manhole.

While the freshly cast concrete is capable of sustaining its own weight, some support must be provided for the resilient gasket to insure that it remains around and positioned correctly in the riser wall until the concrete has cured to a degree sufficient to retain the gasket in place. At the same time, as noted above, it is desirable that the relatively expensive, void defining mold members, which also support the gasket during the casting operation, be removed at the time the form is stripped from the riser for reuse.

(d) Generalized Description of Use of the Invention

The present invention teaches a method for installing a gasket having a pipe-engaging portion and an anchoring portion in the peripheral wall of an opening in a poured-in-place masonry wall, comprising : (i) erecting a form including an inner wall and an outer wall to define the poured-in-place masonry wall; (ii) providing an assembly of (a) an inner mold member of dished shaped having radially outwardly extending flanges thereon of greater diameter than the opening; (b) an outer mold member of complementary dished shaped having side flanges thereon of the same diameter as the opening; and (c) a gasket having a pipe engaging portion and an anchoring portion disposed in means between the outer periphery of a flange on the outer mold member and a flange on the inner mold member adapted to receive the pipe-engaging portion of the gasket and to allow the anchoring portion of the gasket to project radially outwardly; (iii) suspending the assembly at a desired preconceived location between the inner and outer walls of the form by a depending bar having spaced apart means thereon to be joined temporarily but firmly to cooperating means on the assembly; (iv) in filling the space between the walls of the form with settable material, so as to embed the anchoring portion of the gasket in the settable material; and (v) after setting of the material, removing the form, the inner mold member and the outer mold member so as to leave the pipe-engaging portion of the gasket is not embedded in the set material projecting into the space intended to receive the pipe.

The present invention also teaches a method for sealing the space between a pipe and an opening in a wall through which the pipe passes, which method comprises (i) providing a molded elastomeric circular gasket for resiliently supporting a sewer pipe in a manhole opening and sealing the space between the wall of the opening and the surface of the pipe, the transverse cross-section of the gasket having: (a) a generally triangular head, having a forward face provided with an arcuate depressing therein, and a sloping rear face; (b) a generally rectangular body, integral with the generally triangular head; and (d) a generally "L" shaped leg depending from the body, and coextensive with the rear face of the body; (ii) positioning and supporting the gasket so that it is located between wall-defining surfaces with its central axis being generally perpendicular to the plane of the wall and with its "L"-shaped leg extending radially outwardly; (iii) filling the wall space surrounding the gasket with sufficient settable material to fill the space and embed the entire "L"-shaped leg in the settable material; and (iv) allowing the settable material to set.

By yet another aspect of this invention, there is provided, in a method of installing a sealing element for use between the outer surfaces of a pipe and an opening in a masonry wall through which the pipe passes, which method comprising the steps of: casting a wall of settable material about a sectional shaping member sited at a predetermined movable location with respect to the masonry wall configured to produce an opening at the desired location and of the desired dimensions to pass the pipe in slightly spaced relation thereto; the shaping member being provided with means defining a peripheral channel configured to engage a peripheral gasket ring of resilient material and to house a substantial portion only of the ring, leaving a remaining portion extending into the settable material as it is being emplaced; permitting the material to set, and thereafter removing the shaping member.

This invention also teaches a method for installing a sealing element in the peripheral surface of an opening through the body of a manhole wall, which method comprises the steps of installing at a predetermined movable location, between the inner and outer shells of a form for casting the concrete wall of a manhole, a two-part mold, comprising: (a) an inner mold member of dished shaped having radially outwardly extending flanges thereon of greater diameter than the opening; (b) an outer mold member of complementary dished shaped having side flanges thereon of the same diameter as the opening; the mold being configured to hold a portion only of an elastomeric gasket strip, leaving other structure of the gasket strip projecting outwardly from the mold; positioning the mold between the shells by means of a depending bar held to the outer shell and temporarily but firmly secured to and pouring settable material into the space between the inner and outer shells so as to surround and enclose the mold, and so as to surround and enclose those portions of the gasket strip which are not received within the mold; permitting the settable material to set, and then removing the inner and outer forms and separating and removing the two parts of the mold, thus leaving that portion of the gasket strip which had been embedded in the mold projecting into the opening in the body of the manhole wall.

This invention also teaches a method for manufacturing a pre-cast portion of an access pit for underground piping systems comprising the steps of: assembling an annular elastomeric seal body on a mandrel, two part mandrel comprising: (a) an inner mold member of dished shaped having radially outwardly extending flanges thereon of greater diameter than the opening; (b) an outer mold member of complementary dished shaped having side flanges thereon of the same diameter as the opening; (c) means between the outer periphery of a flange on the outer mold member and a flange on the inner mold member adapted to receive the pipe-engaging portion of the gasket and to allow the anchoring portion of the gasket to project radially outwardly; fixing the assembly to one of a pair of form members and positioned between the members by means of a depending bar held to the outer shell and temporarily but firmly secured to; pouring concrete between the form members and around the assembly; and removing the form members and the mandrel after the concrete has set.

BRIEF DESCRIPTION OF THE DRAWINGS

In the accompanying drawings,

FIG. 1 is a perspective view of the manhole with a sewer pipe installed therein according to one embodiment of this invention;

FIG. 2 is a cross-section through line II—II of FIG. 1;

FIG. 3 is a perspective view of the gasket of an embodiment of this invention;

FIG. 4 is a transverse cross-section of the gasket of FIG. 3 embedded in the concrete of the manhole around the hole;

FIG. 5 is an exploded side elevational view of the two part mold of an embodiment of this invention for the installation of the gasket in the hole in the manhole;

Figures 6, 7:
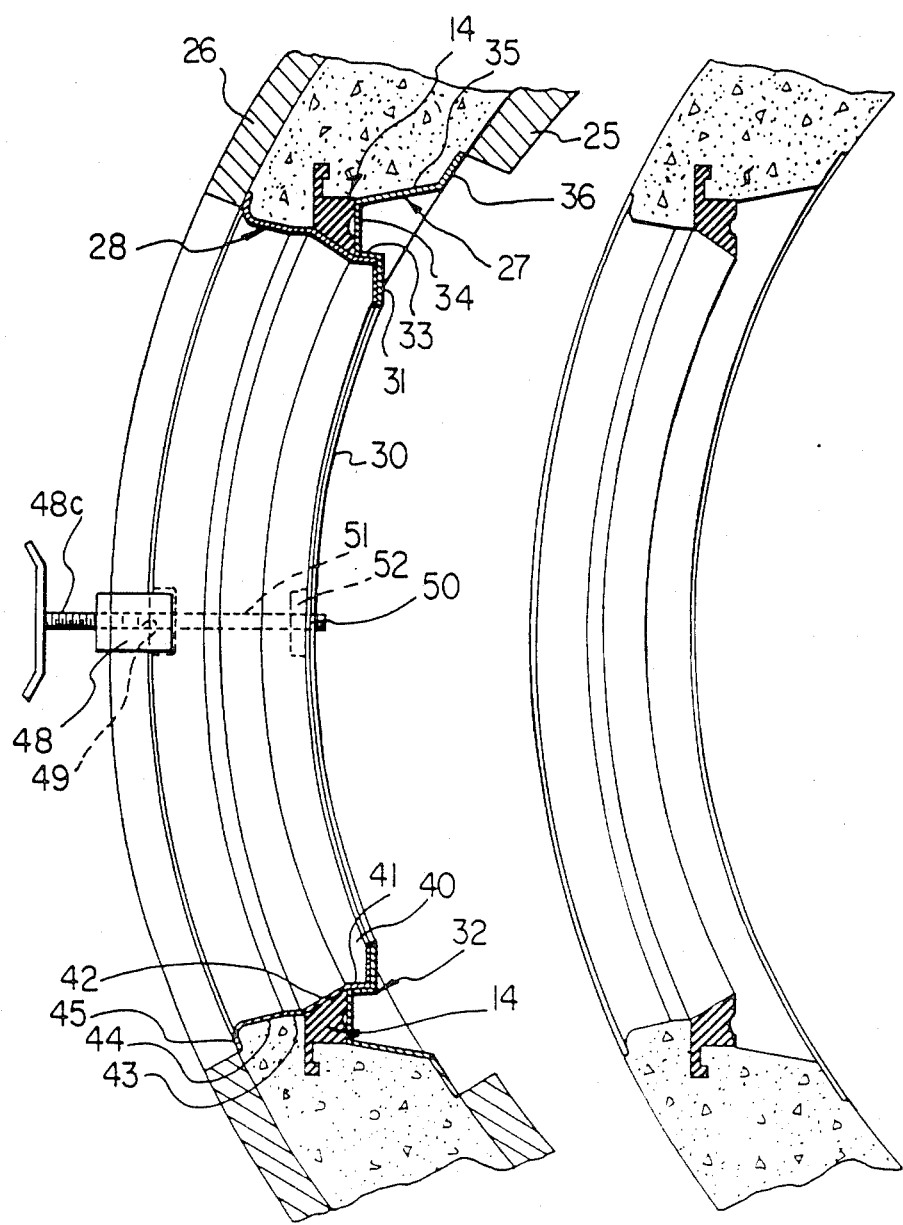
FIG. 6 is a horizontal cross-sectional view of the two-part mold of FIG. 5 in installed attitude.
FIG. 7 is a horizontal cross-sectional view of the hole in the manhole after removal of the two-part mold.

DESCRIPTION OF THE PREFERRED EMBODIMENTS (a) Discription of FIG. 1

As seen in FIG. 1, the manhole 10 is a precast cylindrical member 11 with a concrete sewer pipe 12 extending through an opening 13 therein. The opening 13 is provided with a cast-in-situ gasket 14 to be described in greater detail hereinafter.

(b) Description of FIG. 2

The unique cooperation of the manhole opening 13 and the gasket 14 in maintaining a seal when sewer pipe 12 is inserted as shown in FIG. 2. Here is is seen that the weight of the sewer pipe 12 forces the head 15 of the gasket into its fully compressed position. However excess compression is prevented by contact of the sewer pipe 12 at 60 with flattened annulus 61 of the opening 13 where the base 62 of the sloping face 21 intersects the lower portion of the manhole opening 13. Sealing contact is maintained because of the amount of contact between areas 63 of the sewer pipe 13 and 64 of the gasket 14.

This compression does not result in any transfer of forces to the leg 22, since the forces are absorbed by the compression of the upper portion 18 of the front face 16 into the arcuate depression 19. Moreover, the lower portion 20 of the front face is encased by the concrete. Thus, the lower portion of the head of the gasket and the entire leg 22 are free from forces which might tend to loosen the gasket from within the concrete.

(c) Description of FIGS. 3 and 4

FIGS. 3 and 4 show the cast-in-situ gasket 14 in greater detail. The gasket 14 is a cast, elongated rubber gasket formed into an endless circular form. It consists of a head portion 15 including a front face 16 and a rear face 17. Front face 16 includes an upper deflectable flange 18, an arcuate inset 19 and a lower, embedable portion 20. The rear face 17 is shorter than the front face 16 and is joined thereto by a sloping face 21.

The rear face 17 extends downwardly to a leg 22 which is generally of "L"-shaped i.e. in the form of a downward extension 23 and a forward-facing foot 24, defining a recessed zone 25 therebetween.

(d) Description of FIGS. 5, 6 and 7

As seen in FIGS. 5, 6 and 7, the manhole 10 is cast with the hole 13 therein and with the gasket 14 cast-in-situ by means of a manhole form including inner and outer cylindrical walls 25, 26 and a pair of complementary mold rings 27, 28. The inner mold ring 27 include a main dished central circular area 30, having an annular rim 31 coextensive therewith. A reduction rectangular flange 32 in the form of a radially inwardly extending portion 33 and an annular rim portion 34 leads to an expansion flange 35, terminating in. a dished terminal rim 36.

Outer mold ring 28 includes a main central dished area 40 mating with dished portion 30 and annular rim 31 and a stepped portion 41 mating with portion 33. Stepped portion 41 enlarges to an expansion flange 42 which continues as an intermediate rim 43 and an outer rim 44 terminating in a facia 45.

Before the assembled inner and outer mold rings 27, 28 are placed within the manhole form, the gasket 14 is placed thereon, with face 16 of the gasket abutting face 34 of inner form, and sloping face 21 abutting expansion flange 42. In this way only face 16 and sloping face 21 are adapted to be exposed, with the removal of the gasket 14 being adapted to be embedded in the concrete.

OPERATION OF PREFERRED EMBODIMENTS

In its installation in the manhole form, the two-part mold rings 27, 28 are assembled with their mating rectangular insets 46, 47 respectively together and with the gasket 14 therearound as described above. The mold ring unit is then suspended in the inverted manhole form by means of rectangular fixing bar 48 which has an upper crown 48a and a depending flange 48b and which is provided with spaced apart apertures 49 to align with apertures 50a, 50b, in the insets 47, 46, respectively. A set screw 48c holds the bar 48 to the outer shell 26 (See FIG. 6). When the mold ring assembly is at the predetermined position in the manhole mold to provide aperture 13 at the preselected location, bolts 51 are passed through washers 51a, apertures 49, and 50a and 50b, and through washer 51b, and are held thereon by nuts 52.

Then the concrete is poured into the manhole form and when set, the forms and the mold rings are removed to provide a manhole with an aperture therein having a gasket molded in-situ.

SUMMARY

From the foregoing description, one skilled in the art can easily ascertain the esential characteristics of this invention, and without departing from the spirit and scope thereof, can make various changes and modifications of the invention to adapt it to gvarious usages and conditions. Consequently, such changes and modifications are properly, equitably, and "intended" to be, within the full range of equivalence of the following claims.

We claim:

1. A molded elastomeric circular gasket for resiliently supporting a sewer pipe in a manhole opening and sealing the space between the wall of the opening and the surface of the pipe, the transverse cross-section of said gasket having:
    (a) a generally triangular head, having a forward face provided with an arcuate depression therein, and a sloping rear face;
    (b) a generally rectangular body, integral with said generally triangular head; and
    (c) a generally "L" shaped leg depending from said body, and coextensive with the rear face of said body.

2. For use in forming a fluid-tight seal between a pipe and a wall opening through which said pipe passes, a molded elastomeric circular gasket for resiliently supporting a sewer pipe in a manhole opening and sealing the space between the wall of the opening and the surface of the pipe, the transverse cross-section of said gasket having:
    (a) a generally triangular head, having a forward face provided with an arcuate depression therein, and a sloping rear face;
    (b) a generally rectangular body, integral with said generally triangular head; and
    (c) a generally "L" shaped leg depending from said body, and coextensive with the rear face of said body.

3. For use in forming a fluid-tight seal between a pipe and a wall opening through which said pipe passes, the combination of a mass of settable material externally configured to provide said wall opening and a molded elastomeric circular gasket for resiliently supporting a sewer pipe in a manhole opening and sealing the space between the wall of the opening and the surface of the pipe, the transverse cross-secon of said gasket having:
  (a) a generally triangular head, having a forward face provided with an arcuate depression therein, and a sloping rear face;
  (b) a generally rectangular body, integral with said generally triangular head; and
  (c) a generally "L" shaped leg depending from said body, and coextensive with the rear face of said body extending circumferentially about the opening in said mass with the entire "L"-shaped leg being embedded in settable material and with the head portion of the gasket protruding into the opening.

4. In combination, a concrete manhole structure having a wall opening through which a sewer pipe can pass and a molded elastomeric circular gasket for resiliently supporting a sewer pipe in a manhole opening and sealing the space between the wall of the opening and the surface of the pipe, the transverse cross-section of said gasket having:
  (a) a generally triangular head, having a forward face provided with an arcuate depression therein, and a sloping rear face;
  (b) a generally rectangular body, integral with said generally triangular head; and
  (c) a generally "L" shaped leg depending from said body, and coextensive with the rear face of said body positioned between the inner and outer walls of the manhole and extending circumferentially about the wall opening with the entire "L"-shaped leg being embedded in the concrete surrounding the manhole opening and with the head poriton of the gasket protruding into the manhole opening on the periphery thereof.

* * * * *

UNITED STATES PATENT AND TRADEMARK OFFICE
CERTIFICATE OF CORRECTION

PATENT NO. : 4,693,482

DATED : Sep. 15, 1987

INVENTOR(S) : Daigle et al.

It is certified that error appears in the above-identified patent and that said Letters Patent is hereby corrected as shown below:

Column 2, line 13, the word "Orings" should read --O-rings--;

Column 7, line 44, the word "mamhole" should read --manhole--;

line 55, after the word "apply" insert --a force--;

Column 12, line 22, the word "way" should read --say--;

Column 16, line 29, the word "gvarious" should read --various--;

Column 17, line 2, the word "cross-secon" should read --cross-section--;

Signed and Sealed this

Thirtieth Day of August, 1988

Attest:

DONALD J. QUIGG

Attesting Officer

Commissioner of Patents and Trademarks